United States Patent [19]

Currivan et al.

[11] Patent Number: 5,898,684

[45] Date of Patent: Apr. 27, 1999

[54] TDMA BURST RECEIVER

[75] Inventors: Bruce J. Currivan, Los Altos; Allen P. Edwards, Palo Alto, both of Calif.

[73] Assignee: Stanford Telecommunications, Inc., Sunnyvale, Calif.

[21] Appl. No.: 08/767,960

[22] Filed: Dec. 19, 1996

[51] Int. Cl.[6] .................................................... H04J 3/06
[52] U.S. Cl. .......................................... 370/350; 375/367
[58] Field of Search ................................... 370/503, 509, 370/514, 516, 520, 337, 347, 350; 375/367, 368, 369, 370, 210; 455/213, 334, 306, 308, 222

[56] References Cited

U.S. PATENT DOCUMENTS

| 4,704,736 | 11/1987 | Kasser | 455/213 |
| 4,847,869 | 7/1989 | Labedz et al. | 375/85 |
| 4,897,659 | 1/1990 | Mellon | 342/45 |
| 5,412,352 | 5/1995 | Graham . | |
| 5,553,064 | 9/1996 | Paff et al. . | |
| 5,598,429 | 1/1997 | Marshall | 375/210 |

*Primary Examiner*—Chi H. Pham
*Assistant Examiner*—Kim T. Nguyen
*Attorney, Agent, or Firm*—David R. Gildea

[57] ABSTRACT

A time division multiple access (TDMA) burst receiver and a method for recognizing and providing a time-of-arrival of a TDMA burst transmission having a selected preamble. The TDMA burst receiver includes a blanker for blanking the TDMA burst transmission when the signal level exceeds a pre-selected noise threshold, a signal threshold detector for providing a first tentative time-of-arrival when a correlation of the TDMA burst transmission and the selected preamble exceeds a first threshold and a second tentative time-of-arrival only when the correlation exceeds a second threshold within a selected time period following the first tentative time-of-arrival, and a state machine for providing an operational time-of-arrival corresponding to the first tentative time-of-arrival when the second tentative time-of-arrival is not received and the second tentative time-of-arrival when the second time-of-arrival is received. A demodulator synchronizes to the operational time-of-arrival for demodulating the TDMA burst transmission and providing an output data sequence. A sequence threshold detector issues a semaphore to the state machine to confirm the operation time-of-arrival when a sequence match between the output data sequence and a sequence of said selected preamble exceeds a sequence match threshold.

33 Claims, 3 Drawing Sheets

TDMA BURST RECEIVER

CROSS-REFERENCE TO RELATED APPLICATION

The present application is related to application Ser. No. 08/630,085 entitled "Burst Demodulator for Use in High Speed Bidirectional Digital Cable Transmission System" by Krasner et al.

BACKGROUND OF THE INVENTION

1. Field of the Invention

The invention relates generally to time division multiple access (TDMA) burst receivers and more particularly to a TDMA burst receiver and a method for reliably detecting a preamble.

2. Description of the Prior Art

Modern two-way communication for cable television, hybrid fiber/coax systems, wireless local multipoint distribution systems, and microwave multipoint distribution systems use time division multiple access (TDMA) to carry short burst transmissions in an upstream direction (return path) from multiple subscribers to a headend receiver. In general the return path transmission characteristics, power level, and the clock offset from each subscriber will be different, thereby requiring the headend receiver to re-synchronize to each of the TDMA bursts. In order to minimize overhead time, it is desirable that the TDMA burst receiver be capable of reliably recognizing and synchronizing the preamble in as short a time as possible.

Existing TDMA burst receivers recognize and synchronize to a TDMA burst by correlating a preamble received at the beginning of the burst to an internal representation of the preamble stored in the TDMA burst receiver. A complication in the recognition and synchronization of the preamble is that a high power level of the TDMA burst transmission may cause the TDMA receiver to mistake a sidelobe peak of the autocorrelation of the preamble for the main peak. A further complication is that message data from the subscriber may have the same or nearly the same symbol pattern as the preamble. Yet a further complication is that narrowband noise or ingress may partially mask or emulate the TDMA burst transmission or be so large that its correlation to the preamble is as great as the main peak. A traditional solution to these complexities is to use a long preamble sequence of a few hundred symbols or more. However, such a long preamble sequence increases the time overhead of a system and is uneconomical for a system having data messages of less than a few thousand symbols.

BRIEF SUMMARY OF THE INVENTION

It is therefore an object of the present invention to provide a time division multiple access (TDMA) burst receiver using multiple threshold tests for reliably detecting a time-of-arrival of a TDMA burst transmission having a selected preamble.

Another object is to provide a method using multiple threshold tests for reliably detecting a time-of-arrival of a TDMA burst transmission having a selected preamble.

Briefly, in a preferred embodiment, the time division multiple access (TDMA) burst receiver includes a blanker for blanking the TDMA burst transmission when the signal level exceeds a pre-selected noise threshold, a signal threshold detector for providing a first tentative time-of-arrival when the TDMA burst transmission exceeds a first threshold and a second tentative time-of-arrival only when the TDMA burst transmission exceeds a second threshold within a selected time period following the first tentative time-of-arrival, and a state machine for providing an operational time-of-arrival corresponding to the first tentative time-of-arrival when the second tentative time-of-arrival is not received and the second tentative time-of-arrival when the second time-of-arrival is received. A demodulator synchronizes to the operational time-of-arrival for demodulating the TDMA burst transmission and providing an output data sequence. A sequence threshold detector issues a semaphore to the state machine to confirm the operation time-of-arrival when a sequence match between the output data sequence and a sequence of the selected preamble exceeds a sequence match threshold.

An advantage of the TDMA burst receiver of the present invention is that a time-of-arrival of a TDMA burst transmission including a selected preamble is distinguished from ingress noise, message data, and sidelobes of the preamble autocorrelation by using multiple threshold tests.

An advantage of the method of the present invention is that a time-of-arrival of a TDMA burst transmission including a selected preamble is distinguished from ingress noise, message data, and sidelobes of the preamble autocorrelation by using multiple threshold tests.

These and other objects and advantages of the present invention will no doubt become obvious to those of ordinary skill in the art after having read the following detailed description of the preferred embodiments which are illustrated in the various figures.

DETAILED DESCRIPTION OF THE INVENTION

Figure 1:
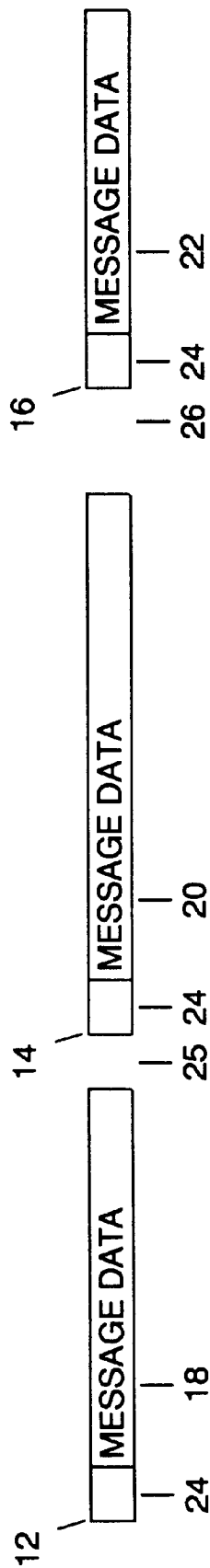
FIG. 1 is a signal diagram of return path time division multiple access (TDMA) burst transmissions from multiple subscribers where each TDMA burst transmission includes a preamble and message data from one of the multiple subscribers.

FIG. 1 is a signal diagram illustrating time division multiple access (TDMA) transmission bursts 12, 14, and 16 in the upstream direction (return path) from multiple subscribers to a headend TDMA burst receiver 10 (FIG. 2) of the present invention. Symbols in the TDMA burst transmissions 12, 14, and 16 are carried as modulation on a radio frequency (RF) signal. Each TDMA burst transmission 12, 14, and 16 includes message data 18, 20, and 22, respectively, and a selected preamble 24. In general, each of the message data 18, 20, and 22 are transmitted from a different one of the multiple subscribers. Time gaps 25 and 26 that are not necessarily equal in length separate TDMA burst transmission 12 from 14 and TDMA burst transmission 14 from 16, respectively.

The preamble 24 is selected for several qualities including short duration, a sufficient number of symbol transitions for symbol timing, good autocorrelation properties for recognition and frame timing, and wide frequency spectrum to allow frequency equalization. Some workers in the field divide the preamble 24 into several components where each component has a specific function such as a symbol timing sequence including multiple "01" transitions for use in synchronizing to the incoming symbols and a unique word sequence for recognizing the times-of-arrival of the TDMA burst transmissions 12, 14, and 16 and synchronizing to an incoming frame of the message data 18, 20, and 22, respectively. The preamble 24 may be optimized for a particular modulation constellation of a radio frequency (RF) signal, such as binary phase shift key (BPSK), quadrature phase shift key (QPSK), four quadrature amplitude modulation (4QAM), sixteen quadrature amplitude modulation (16QAM), and many others, used for carrying the TDMA burst transmissions 12, 14, and 16. In a preferred embodiment, the present invention uses a BPSK modulation constellation and a sixteen bit Neuman-Hoffman sequence of "0000111011101101" for the selected preamble 24 and QPSK or 16QAM modulation for message data 18, 20, and 22. However, those skilled in the art will know that other modulation constellations and/or other preamble sequences may equally well be used.

Figure 2:
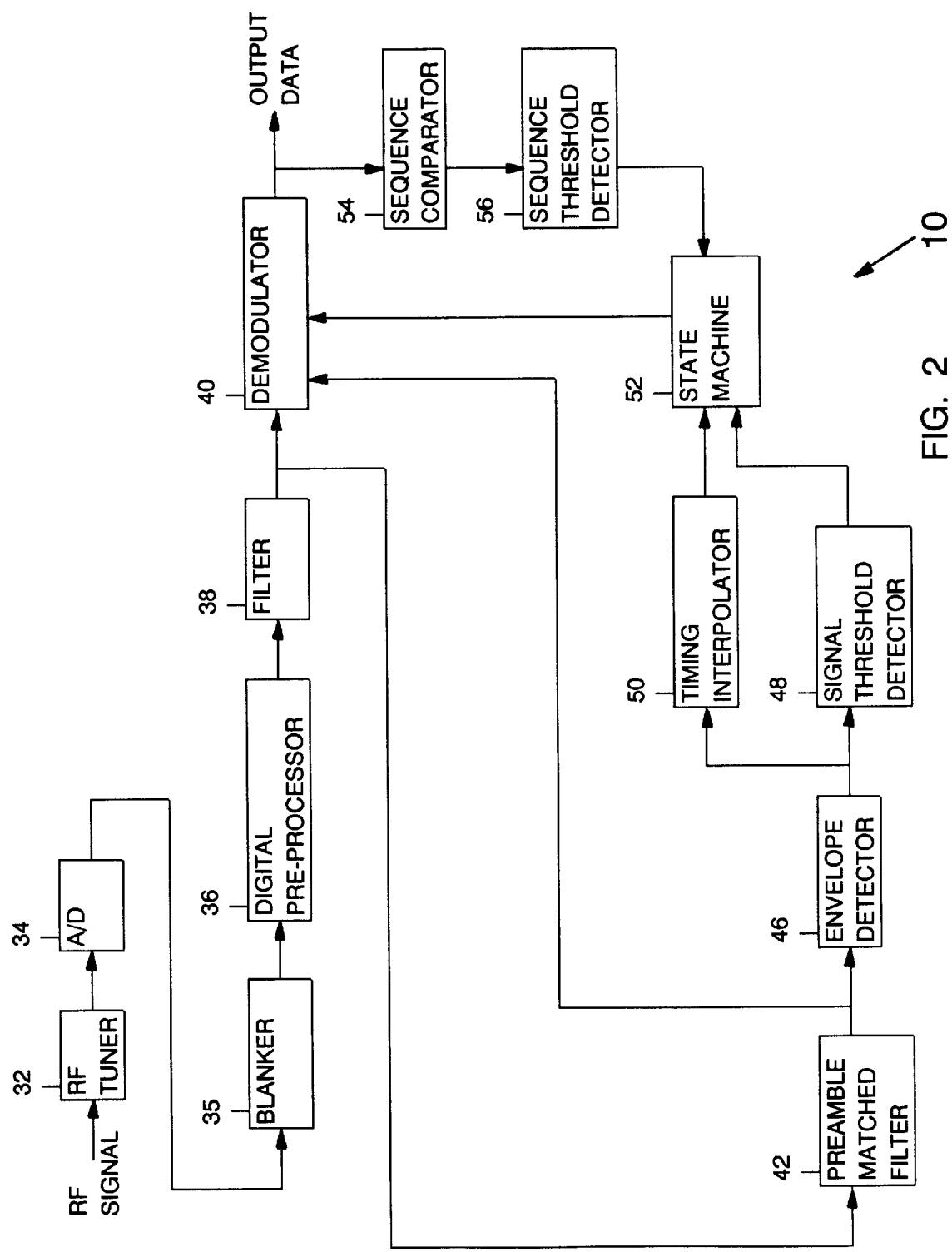
FIG. 2 is a block diagram of a time division multiple access (TDMA) burst receiver for receiving the TDMA burst transmissions of FIG. 1.

FIG. 2 is a block diagram of the time division multiple access (TDMA) burst receiver of the present invention referred to herein by the general reference number 10. The TDMA burst receiver 10 includes a radio frequency (RF) tuner 32 including a local oscillator for receiving the RF signal including modulation for the TDMA burst transmissions 12, 14, and 16. The RF tuner 32 selects a frequency channel, converts the frequency of the RF signal to a representative intermediate frequency (IF) TDMA signal, and amplifies the IF TDMA signal. In a preferred embodiment, the tuner 32 receives the RF signal in a frequency range of about five to forty-two megahertz and upconverts to an intermediate frequency of about seventy megahertz. An analog to digital converter (A/D) 34 converts the IF TDMA signal from an analog form to a digital form having two or more samples per symbol period, such as four, and one or more bits of resolution per sample, such as eight, and issues a digital TDMA signal to a blanker 35.

The blanker 35 prevents large noise bursts from being processed in the circuits that follow by replacing the digital TDMA signal with a selected digital value, such as zero, when it detects that the signal has an amplitude that is higher than a digital noise threshold. Alternatively, an analog blanker is placed between the tuner 32 and the A/D 34 for shorting the IF TDMA signal to an analog level, such as ground, when the signal exceeds a analog noise threshold. The blanker 35 passes the digital TDMA signal to a digital preprocessor 36 for converting the digital TDMA signal into representative baseband I and Q signals. U.S. Pat. No. 5,553,064 by Paff et al., incorporated herein by reference, discloses an example of such digital preprocessor 36.

The digital preprocessor 36 passes the I and Q signals to a filter 38 having a Nyquist response corresponding to I and Q symbol rates in the TDMA burst transmissions 12, 14, and 16 (FIG. 1). The filter 38 passes filtered I and Q signals to a demodulator 40 and a preamble matched filter 42. The preamble matched filter 42 includes an I and a Q shift register of the length of the preamble times the number of samples per symbol period for storing a representation of the selected preamble for I and Q in reverse order.

The preamble matched filter 42 correlates the filtered I and Q signals to the selected preamble 24 and passes I and Q correlation signals having two or more levels with two or more samples per symbol period representative of the correlation of the selected preamble and the TDMA burst transmission 12, 14, and 16 to an envelope detector 46. The envelope detector 46 converts the I and Q correlation signals into a correlation magnitude signal having a signal level proportional to the square root of the sum of the squares of the I level and the Q level and passes the correlation magnitude signal to a signal threshold detector 48 and a timing interpolator 50. Information and a representative example of a combination of such preamble matched filter, envelope detector, and signal threshold detector is commercially available from Stanford Telecom, Telecom Products Group of Sunnyvale, Calif. as a model STEL-3340 Digital Matched Filter.

The signal threshold detector 48 compares the correlation magnitude signal to a first selected threshold level and passes a first electronic semaphore to a state machine 52 when the digital level of samples of the correlation magnitude signal have a first peak in level that exceeds the first threshold level. The time that the first semaphore is issued from the signal threshold detector 48 corresponds within the resolution of the sample period to the time of a first tentative arrival of the TDMA burst transmission 12, 14, or 16. However, in a preferred embodiment the timing interpolator 50 interpolates between the samples of the correlation magnitude signal to determine a more accurate time for the peak of the correlation magnitude signal, thereby improving the time accuracy for the first tentative time-of-arrival. For four samples per I and/or Q symbol period, a quadratic interpolation has been found to be adequate. Alternatively, the time-of-arrival can be found by subtracting early and late correlation signals as described in the U.S. Pat. No. 5,553,064 by Paff et al.

The timing interpolator 50 passes a timing signal including information for the first tentative time-of-arrival to the state machine 52. The state machine 52 then opens a correlation time gate having a selected time period, for example a time period of approximately one-half of the symbol period, and controls the signal threshold detector 48 to compare the correlation magnitude signal against a second selected threshold level. Typically, the second threshold is greater than the first threshold either by a selected ratio, for example two, or by an absolute magnitude. At the time of the first peak following the time that the correlation magnitude signal exceeds the second threshold while the correlation time gate is open, the signal threshold detector 48 passes a second electronic semaphore to the state machine 52 for indicating a second tentative time-of-arrival of the TDMA burst transmission 12, 14, or 16. The timing interpolator 50 interpolates between successive samples of the correlation magnitude signal to find a maximum of the correlation magnitude signal for determining a second tentative time-of-arrival of the TDMA burst transmission 12, 14, or 16 and passes the timing signal including information for the second tentative time-of-arrival to the state machine 52. The state machine 52 then discards the first tentative time-of-arrival and uses the second tentative time-of-arrival as an operational time-of-arrival. When the state machine 52 does not receive the second semaphore or succeeding semaphore within the correlation time gate, the first or previous tentative time-of-arrival is used as the operational time-of-arrival. The state machine 52 then passes an operational timing signal including the operational time-of-arrival to the demodulator 40.

The demodulator 40 synchronizes an internal symbol timing clock to the operational time-of-arrival and uses the symbol timing clock to demodulate the filtered I and Q signals at the correct times to minimize intersymbol interference for providing I and Q output bit streams to a sequence correlator 54. The filtered I and Q signals may be delayed in the demodulator 40 before being demodulated in order that the operational time-of-arrival may be used in the demodulation of the preamble 24 (FIG. 1). Where a BPSK modulation constellation is used the demodulator 40 can be aligned so that only I or only Q output bit stream is required. The sequence comparator 54 compares the output bit stream to a bit stream corresponding to the selected preamble and issues information for the sequence match to a sequence threshold detector 56. Either the entire preamble or a portion, such as the last eight bits, of the preamble may be used for the comparison. When the sequence match exceeds a sequence match threshold, for example seven of the last eight bits in the preamble, the sequence threshold detector 56 passes a third semaphore to the state machine 52 to confirm the operational time-of-arrival. Then, the state machine 52 controls the demodulator 40 to continue to demodulate to the filtered I and Q signals according to the operational time-of-arrival. Of course, any of the electronic semaphores referred to herein may include a single bit or multiple bits of information.

The demodulator 40 includes carrier recovery circuitry for phase locking the local oscillator in the RF tuner 32 to the carrier frequency of the RF signal once the desired frequency channel has been selected. In a preferred embodiment the demodulator 40 includes a phase estimator for determining a correlation phase from the I and Q correlation signals at the operational time-of-arrival for initializing the phase of the carrier recovery circuitry and preventing the carrier recovery circuitry from hanging up at a multiple of one hundred-eighty degrees from the correct phase.

The state machine 52 operates by having states indicative of the status of a possible reception of the preamble indicating a new one of the TDMA burst transmissions 12, 14, and 16 and conditions of the TDMA burst receiver 10 in general in an organized manner based upon events that are indicated to the state machine 52 by electronic signals or semaphores. The TDMA burst receiver 10 may include a microprocessor system including a microprocessor and associated memory including executable code for instructing the microprocessor for receiving information from and issuing control to the various elements of the receiver 10. The state machine 52 may be implemented with the executable code in the microprocessor system or, preferably with digital logic circuits. The hardware for such digital circuits and the blanker 35, the digital preprocessor 36, the filter 38, the demodulator 40, the preamble matched filter 42, the envelope detector 46, the signal threshold detector 48, the timing interpolator 50, sequence comparator 54, and sequence threshold detector 56 may be constructed by programming a programmable gate array or designing an Application Specific Integrated Circuit (ASIC). Suitable programmable gate arrays are commercially available from many sources including Altera Corp. of San Jose, Calif. and Xilinx Corp. of Santa Clara, Calif.

Figure 3:
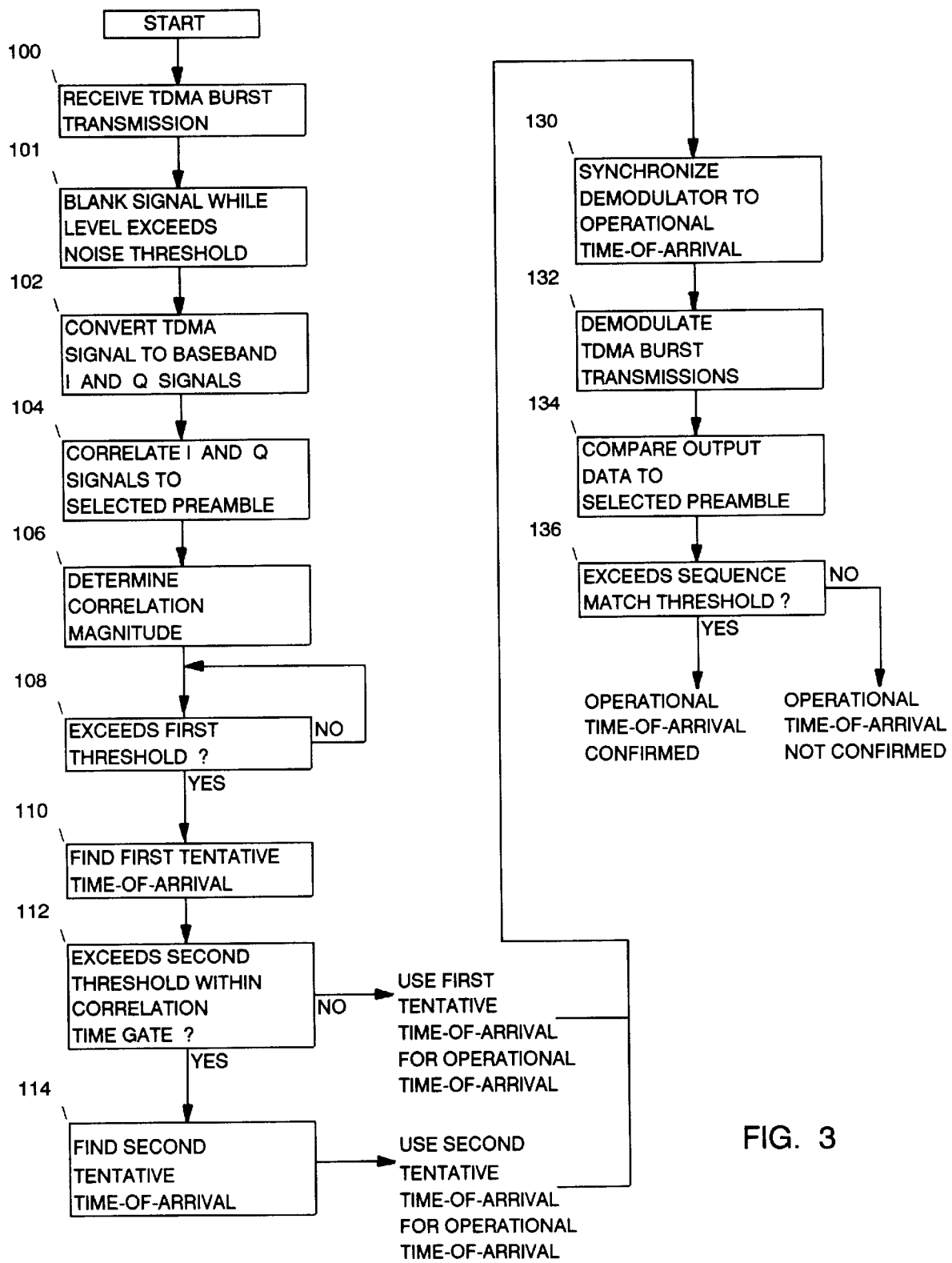
FIG. 3 is a flow chart of a method using the TDMA burst receiver of FIG. 2 for detecting the times-of-arrival of the preamble in the TDMA burst transmissions of FIG. 1.

FIG. 3 is a flow chart illustrating a method in the TDMA burst receiver 10 for recognizing and synchronizing to the preamble 24. In a step 100 the TDMA burst receiver 10 receives the RF signal including the TDMA burst transmissions 12, 14, or 16 as modulation. In a step 101 a TDMA signal representative of the TDMA burst transmissions 12, 14, and 16 is blanked by replacing the TDMA signal with a replacement level when the signal level exceeds a noise threshold. Blanking may be done either before or after digitizing by replacing an analog or a digital representation of the TDMA signal with a pre-selected analog level or digital value, respectively. In a step 102 the TDMA signal is converted to baseband I and Q signals. In a step 104 the preamble matched filter 42 correlates the baseband I and Q signals with the selected preamble 24 and issues I and Q correlation signals to the envelope detector 46. In a step 106 the envelope detector 46 converts the I and Q correlation signals into a correlation magnitude signal having a magnitude of the square root of the sum of the squares of the I and Q levels of the I and Q correlation signals. The envelope detector 46 passes the correlation magnitude signal to the signal threshold detector 48 and the timing interpolator 50. In a step 108 the signal threshold detector 48 compares the level of the correlation magnitude signal to the first threshold and detects the time of a peak level. When the correlation magnitude signal reaches the peak after exceeding the first threshold, the signal threshold detector 48 passes the first semaphore to a state machine 52 indicating the time for the first tentative arrival of the TDMA burst transmission 12, 14, or 16.

In a step 110, the timing interpolator 50 interpolates between successive samples of the correlation magnitude signal to determine a more accurate time for the peak level corresponding to the first tentative time-of-arrival. The timing interpolator 50 passes the timing signal including information for the first tentative time-of-arrival to the state machine 52. In a step 112 the state machine 52 opens the correlation time gate and controls the signal threshold detector 48 to compare the correlation magnitude signal to the second threshold. When the correlation magnitude signal peaks after exceeding the second threshold, the signal threshold detector 48 passes the second semaphore to the state machine 52 indicating a time for the second tentative arrival of the TDMA burst transmission 12, 14, or 16. When the correlation time gate closes before the state machine 52 receives the second semaphore, the state machine 52 passes the operational timing signal including the operational time-of-arrival corresponding the first tentative time-of-arrival to the demodulator 40. In a step 114, when the state machine 52 receives the second semaphore before the correlation time gate closes, the timing interpolator 50 interpolates between successive samples of the correlation magnitude signal to determine a more accurate time for the second tentative time-of-arrival. The timing interpolator 50 passes a timing signal including information for the second tentative time-of-arrival to the state machine 52. The state machine 52 discards the first tentative time-of-arrival and uses the second tentative time-of-arrival as the operational time-of-arrival. The state machine 52 then passes the operational timing signal including the operational time-of-arrival corresponding the second tentative time-of-arrival to the demodulator 40.

In a step 130 the demodulator 40 synchronizes an internal symbol timing clock to the operational time-of-arrival. In a step 132 the demodulator 40 uses the symbol timing clock to sample the filtered I and Q signals at the correct times to minimize intersymbol interference and issuing I and Q output bit streams to the sequence correlator 54. In a step 132 the sequence comparator 54 compares the output bit stream to a bit stream corresponding to the selected preamble 24 or a portion of the preamble 24 and issues information for the sequence match to a sequence threshold detector 56. In a step 134 when the sequence match exceeds a sequence match threshold the sequence threshold detector 56 passes a third semaphore to the state machine 52 to confirm the operational time-of-arrival.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method in a time division multiple access (TDMA) receiver for synchronizing to a TDMA burst transmission including a selected preamble, comprising steps of:

converting said TDMA burst transmission into a correlation magnitude signal corresponding to the magnitude of a correlation between said TDMA burst transmission and said selected preamble;

detecting a first tentative time-of-arrival for said TDMA burst transmission when said correlation magnitude signal exceeds a first threshold;

detecting a second tentative time-of-arrival for said TDMA burst transmission when said correlation magnitude signal exceeds a second threshold within a selected time period following said first tentative time-of-arrival; and determining an operational time-of-arrival corresponding to said second tentative time-of-arrival when said second tentative time-of-arrival is detected and corresponding to said first tentative time-of-arrival when said first but not said second tentative time-of-arrival is detected.

2. The method of claim 1, further including steps of:

converting said TDMA burst transmission into a representative TDMA signal; and blanking said representative TDMA signal for preventing said TDMA receiver from synchronizing to said TDMA burst transmission while a signal level of said representative TDMA signal exceeds a selected noise threshold.

3. The method of claim 2, wherein:

said representative TDMA signal is an analog signal; and the step of blanking includes a step of replacing said analog signal with a pre-selected analog level while said analog signal exceeds said noise threshold.

4. The method of claim 2, wherein:

said representative TDMA signal is a digital signal; and the step of blanking includes a step of replacing said digital signal with a pre-selected digital value while said digital signal exceeds said noise threshold.

5. The method of claim 1, further including a step of:

confirming said operational time-of-arrival when a sequence match between an output data sequence demodulated from said TDMA burst transmission using said operational time-of-arrival and a sequence of said selected preamble exceeds a sequence match threshold.

6. The method of claim 5, further including steps of:

receiving said operational time-of-arrival with a demodulator;

synchronizing said demodulator to said operational time-of-arrival; and demodulating said TDMA burst transmission for providing said output data sequence.

7. The method of claim 1, further including steps of:

receiving I and Q signals representative of said TDMA burst transmission in a preamble matched filter;

correlating said I and Q signals and said representation of said selected preamble in said preamble matched filter;

issuing a correlation signal from said preamble matched filter; and determining said correlation magnitude signal from said correlation signal with an envelope detector.

8. The method of claim 1, wherein:

the step of detecting said first tentative time-of-arrival includes steps of: determining values of said correlation magnitude signal before, during, and after a first peak of said correlation magnitude signal after said correlation magnitude signal has exceeded said first threshold; and interpolating said values for determining said first tentative time-of-arrival.

9. The method of claim 1, wherein:

said second threshold is greater than said first threshold; and said second threshold and said first threshold have a selected ratio.

10. The method of claim 1, wherein:

said second threshold is greater than said first threshold by a selected difference.

11. A burst receiver for receiving a time division multiple access (TDMA) burst transmission including modulation for a selected preamble, comprising:

a signal threshold detector for receiving a correlation magnitude signal corresponding to the magnitude of a correlation between said TDMA burst transmission and said selected preamble, detecting a first tentative time-of-arrival of said TDMA burst transmission when said correlation magnitude signal exceeds a first threshold, and detecting a second tentative time-of-arrival of said TDMA burst transmission when said correlation magnitude signal exceeds a second threshold within a selected time period following said first tentative time-of-arrival; and a state machine coupled to the signal threshold detector for determining an operational time-of-arrival corresponding to said second tentative time-of-arrival when said second tentative time-of-arrival is detected and corresponding to said first tentative time-of-arrival when said first but not said second tentative time-of-arrival is detected.

12. The receiver of claim 11, further including:

a blanker for receiving a first TDMA signal representative of said TDMA burst transmission and issuing a second TDMA signal having a selected replacement level while a signal level of said first TDMA signal exceeds a selected noise threshold, said second TDMA signal for use in representing said TDMA burst transmission for finding said correlation magnitude signal.

13. The receiver of claim 12, wherein:

said first TDMA signal is an analog signal; and the blanker is for replacing said analog signal with a selected analog level while said signal level exceeds said noise threshold.

14. The receiver of claim 12, wherein:

said first TDMA signal is a digital signal; and the blanker is for replacing said digital signal with a selected digital value while said signal level exceeds said noise threshold.

15. The receiver of claim 11, further including:

a sequence threshold detector for receiving information for a sequence match between an output data sequence demodulated from said TDMA burst transmission using said operational time-of-arrival and a preamble sequence for said selected preamble and coupled to the state machine for confirming said operational time-of-arrival when said sequence match exceeds a sequence match threshold.

16. The receiver of claim 11, further including:

a demodulator coupled to the state machine for synchronizing to said operational time-of-arrival for demodulating said TDMA burst transmission and coupled to the sequence threshold detector for providing said output data sequence.

17. The receiver of claim 11, further including:

a preamble matched filter for receiving I and Q signals representative of said TDMA burst transmission and issuing a correlation signal for a correlation between said TDMA burst transmission and said representation of said selected preamble; and an envelope detector coupled to the preamble matched filter for receiving said correlation signal and coupled to the signal threshold detector for providing said correlation magnitude signal to the signal threshold detector.

18. The receiver of claim 17, further including:

a timing interpolator coupled to the envelope detector for interpolating between successive samples of said correlation magnitude signal for improving a time accuracy of said first tentative time-of-arrival.

19. The receiver of claim 11, wherein:

said second threshold is greater than said first threshold; and said second threshold and said first threshold have a selected ratio.

20. The receiver of claim 11, wherein:

said second threshold is greater than said first threshold by a selected difference.

21. A burst receiver for receiving a time division multiple access (TDMA) burst transmission including modulation for a selected preamble, comprising:

signal threshold detector means for receiving a correlation magnitude signal corresponding to the magnitude of a correlation between said TDMA burst transmission and said selected preamble, detecting a first tentative time-of-arrival for said TDMA burst transmission when said correlation magnitude signal exceeds a first threshold, and detecting a second tentative time-of-arrival for said TDMA burst transmission when said correlation magnitude signal exceeds a second threshold within a selected time period following said first tentative time-of-arrival; and state machine means coupled to the signal threshold detector means for determining an operational time-of-arrival corresponding to said second tentative time-of-arrival when said second tentative time-of-arrival is detected and corresponding to said first tentative time-of-arrival when said first but not said second tentative time-of-arrival is detected.

22. The receiver of claim 21, further including:

blanking means for blanking said TDMA burst transmission for preventing said correlation magnitude signal from exceeding said first threshold while a signal level of said TDMA burst transmission exceeds a noise threshold.

23. The receiver of claim 22, wherein:

the blanking means is for replacing an analog representation of said TDMA burst transmission with a preselected analog level while said signal level exceeds said noise threshold.

24. The receiver of claim 22, wherein:

the blanking means is for replacing a digital representation of said TDMA burst transmission with a preselected digital value while said signal level exceeds said noise threshold.

25. The receiver of claim 21, further including:

sequence threshold detector means for receiving information for a sequence match between an output data sequence demodulated from said TDMA burst transmission using said operational time-of-arrival and a preamble sequence for said selected preamble and coupled to the state machine for confirming said operational time-of-arrival when said sequence match exceeds a sequence match threshold.

26. The receiver of claim 21, further including:

demodulator means, coupled to the state machine means, for synchronizing to said operational time-of-arrival for demodulating said TDMA burst transmission for providing said output data sequence.

27. The receiver of claim 21, further including:

preamble matched filter means for receiving I and Q signals representative of said TDMA burst transmission and issuing a correlation signal for a correlation between said TDMA burst transmission and said representation of said selected preamble; and envelope detector means for receiving said correlation signal and providing said correlation magnitude signal to the signal threshold detector means.

28. The receiver of claim 27, further including:

timing interpolator means, coupled to the envelope detector means, for interpolating between successive samples of said correlation magnitude for improving a time accuracy of said first tentative time-of-arrival.

29. The receiver of claim 21, wherein:

said second threshold is greater than said first threshold; and said second threshold and said first threshold have a selected ratio.

30. The receiver of claim 21, wherein:

said second threshold is greater than said first threshold by a selected difference.

31. A burst receiver for receiving a time division multiple access (TDMA) burst transmission including modulation for a selected preamble, comprising:

a signal threshold detector for receiving a correlation magnitude signal corresponding to the magnitude of a correlation between said TDMA burst transmission and said selected preamble, detecting a first tentative time-of-arrival of said TDMA burst transmission when said correlation magnitude signal exceeds a first threshold, and detecting a second tentative time-of-arrival of said TDMA burst transmission when said correlation magnitude signal exceeds a second threshold within a selected time period following said first tentative time-of-arrival; and a microprocessor coupled to the signal threshold detector including executable code for determining an operational time-of-arrival corresponding to said second tentative time-of-arrival when said second tentative time-of-arrival is detected and corresponding to said first tentative time-of-arrival when said first but not said second tentative time-of-arrival is detected.

32. The receiver of claim 31, further including:

a sequence threshold detector for receiving information for a sequence match between an output data sequence demodulated from said TDMA burst transmission using said operational time-of-arrival and a preamble sequence for said selected preamble; and wherein:

the microprocessor including said executable code is further for confirming said operational time-of-arrival when said sequence match exceeds a sequence match threshold.

33. The receiver of claim 31, further including:

a demodulator coupled to the microprocessor for synchronizing to said operational time-of-arrival for demodulating said TDMA burst transmission and providing said output data sequence.

* * * * *